L. P. SMITH & J. CANTOR.
SOLDERING DEVICE.
APPLICATION FILED DEC. 30, 1910.
1,004,922.
Patented Oct. 3, 1911.
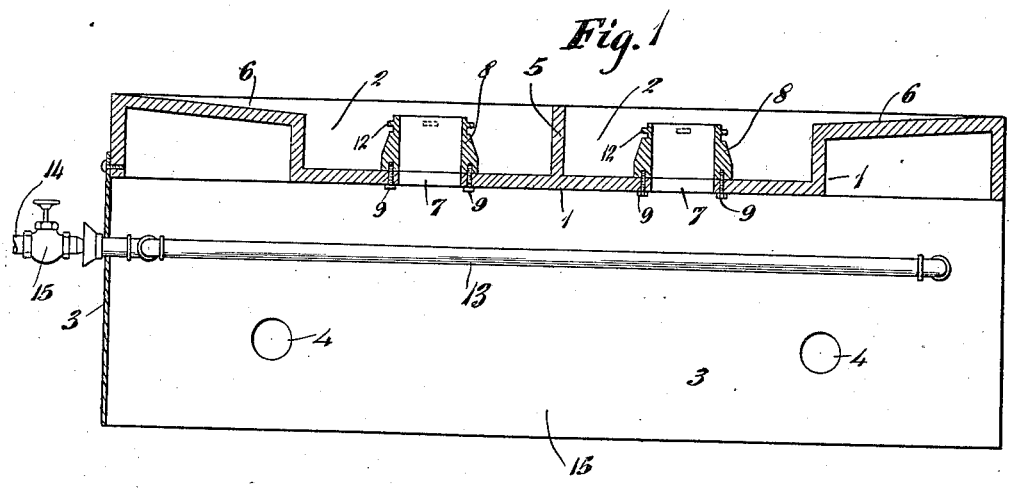
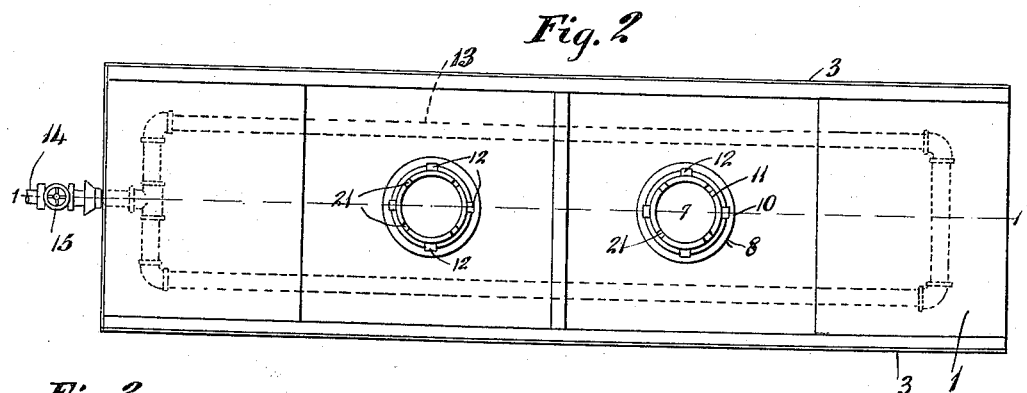
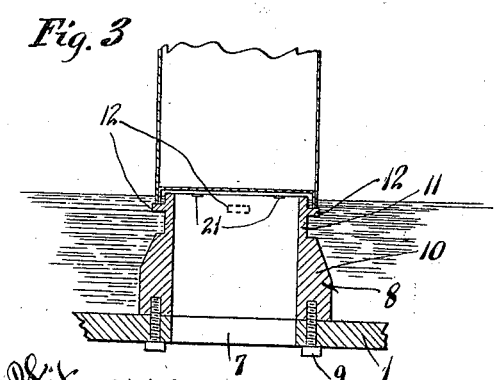
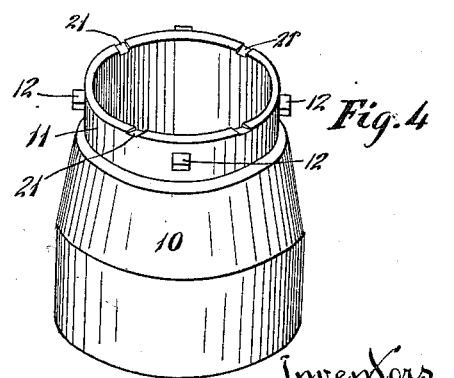
Witnesses
Oliver J. Carnean
Winona Doan
Inventors
Lionel P. Smith
Julius Cantor
By
James N. Ramsey
Attorney
COLUMBIA PLANOGRAPH CO., WASHINGTON, D. C.

UNITED STATES PATENT OFFICE.

LIONEL P. SMITH, OF COVINGTON, KENTUCKY, AND JULIUS CANTOR, OF CINCINNATI, OHIO.

SOLDERING DEVICE.

1,004,922. Specification of Letters Patent. Patented Oct. 3, 1911.

Application filed December 30, 1910. Serial No. 600,138.

*To all whom it may concern:*

Be it known that we, LIONEL P. SMITH and JULIUS CANTOR, residents of the United States, residing at Covington, in the county of Kenton and State of Kentucky, and at Cincinnati, in the county of Hamilton and State of Ohio, respectively, have invented certain new and useful Improvements in Soldering Devices, of which the following is a specification.

Our invention relates to soldering devices, and more particularly to devices for soldering the bottoms or tops in cans of various shapes and sizes.

The object of our invention is to produce a simple, inexpensive, efficient and economically operated device for rapidly and neatly soldering the bottoms or tops of cans securely therein.

Another object of our invention is to produce a soldering device by means of which any number of cans may be soldered at the same time, according to the number of pedestals and supports provided in the pan.

Our invention consists in a pan adapted to hold molten solder, means for melting and heating the solder and a pedestal having an overflow and provided with suitable supports for the can.

Our invention also consists in the parts and combination of parts, and in the details of construction and arrangement as herein set forth and claimed.

In the accompanying drawing which serves to illustrate the construction and use of our invention: Figure 1 is a longitudinal vertical section taken on the line 1—1 of Fig. 2. Fig. 2 is a plan view of our device. Fig. 3 is a fragmentary vertical section taken through one of the pedestals employed in our invention, showing the solder level and the can in its proper position for soldering. Fig. 4 is a perspective view of one of the pedestals.

In the embodiment of our invention as illustrated, and which shows a preferred construction, 1 represents a solder pan, with bowls or solder basins 2 therein. The solder pan 1 is supported by means of side plates 3, suitably fastened to the pan and provided with ventilating holes 4 therein. The solder basins 2 may be divided, if desired, by means of a partition 5, and the ends of the pan are preferably provided with incline 6, to support bars of solder while being melted. Each basin 2 is provided with an opening 7 in its bottom over and around which is bolted a pedestal 8, by means of bolts 9. The pedestal 8 is provided with a body 10 and neck 11 on the sides of which are mounted a plurality of supports or lugs 12, placed or fastened a short distance below the upper edge of the neck 11. It is upon these lugs 12 that the can is adapted to rest. When the solder is placed upon the incline 6 of the pan 1, it is adapted to be melted by any means desired, preferably by gas burner pipes 13, which are supplied by gas through a supply pipe 14, provided with a valve 15 therein. Enough solder is melted to bring the level of same up to a point above the lugs 12 on the neck 11 of the pedestal 8 or very close to the top of the pedestal. Slots 21 are preferably provided in the top edge of the neck 11 to permit the surplus of molten solder to overflow through the interior of the pedestal, and will thus drop down inside of the pedestal 8, through the opening 7 of the pan into the heating chamber 15, where it will form into cakes, and may be readily removed and remelted.

In the soldering of cans in accordance with our invention, the body of each can is formed in the usual way with open ends. The bottom or top is formed with a flange and the flanged top or bottom is adapted to be placed and fit tightly within the end of the body, in the manner shown in Fig. 3, the edge of the flange whether of the top or bottom, extending outwardly, as shown in said figure. The bottoms or tops are placed upon a surface with the flange extending downwardly, and the ends of the body portion are dipped in the flux or acid, and pressed over the top or bottom, until the edges of the can and the flange are even, as shown in Fig. 3. The assembled parts are then placed in the molten solder upon the pedestals as shown in Fig. 3, where they are permitted to remain for a short time, and are then removed therefrom, by giving the same a slight turn as it is being lifted out of the solder. This slight turn insures the covering with solder of the parts of the can resting on the lugs. The other end of the can is treated in the same manner. This insures a uniform soldering of all cans, and the solder is uniformly and evenly distributed upon the top and bottom of each can, without any cracks or crevices, or openings of any kind to cause leakage.

The pan may have a single pedestal or as many basins and pedestals as desired may be provided. When more than two basins with pedestals are provided in a single pan, the intermediate basins may be replenished with molten solder by dipping with a ladle from the end basins into the intermediate basins to maintain the proper level of molten solder. The proper level of molten solder may be maintained by melting additional solder, but a great many cans may be soldered without replenishing the supply of solder before the level falls too low to take effect on the cans.

It will be seen that by the use of our invention the solder is applied evenly and uniformly and no more solder is used than is necessary, thus a saving in the amount of solder used is effected, and there is no rough or uneven surface formed in soldering.

Inexperienced persons can readily and quickly assemble the parts and solder the cans according to our invention. This dispenses with the expense of soldering-irons, and it requires less heat to melt and maintain the molten solder than it does to heat the soldering-irons.

With our invention a great many more cans can be soldered in a shorter length of time, and the cans may be soldered with much less labor and expense than otherwise.

Many modifications of our invention may be made without departing from its spirit or scope, and we do not therefore desire to be limited to the exact details of construction and arrangement shown.

We claim:

1. A soldering device comprising a solder pan having an opening in the bottom thereof, a hollow pedestal mounted thereon and having a body portion, a neck portion at the top thereof, said neck extending upwardly from said body portion, and a plurality of lugs extending laterally from the neck portion thereof at such a distance intermediate of the top and bottom of said neck as to support the article being soldered above the pedestal and provide a passage for the flow of the solder, substantially as set forth and for the purposes specified.

2. A device of the character described comprising a hollow pedestal having a body portion, a neck portion at the top thereof, a plurality of lugs extending laterally from the neck portion and just below the top of said neck portion, and a slotted top to permit the surplus of molten solder to overflow through the interior of the pedestal, substantially as set forth and for the purposes specified.

LIONEL P. SMITH.
JULIUS CANTOR.

Witnesses:
JAMES N. RAMSEY,
WINONA DOAN.

---

Copies of this patent may be obtained for five cents each, by addressing the "Commissioner of Patents, Washington, D. C."